US009100600B2

(12) United States Patent
Hizi

(10) Patent No.: US 9,100,600 B2
(45) Date of Patent: Aug. 4, 2015

(54) ANTI-BLOOMING SHUTTER CONTROL IN IMAGE SENSORS

(71) Applicant: Samsung Electronics Co., Ltd., Suwon-Si, Gyeonggi-Do (KR)

(72) Inventor: Uzi Hizi, Herzliya (IL)

(73) Assignee: SAMSUNG ELECTRONICS CO., LTD. (KR)

( * ) Notice: Subject to any disclaimer, the term of this patent is extended or adjusted under 35 U.S.C. 154(b) by 31 days.

(21) Appl. No.: 13/938,798

(22) Filed: Jul. 10, 2013

(65) Prior Publication Data

US 2015/0015747 A1    Jan. 15, 2015

(51) Int. Cl.
*H04N 5/335* (2011.01)
*H04N 5/359* (2011.01)

(52) U.S. Cl.
CPC .................. *H04N 5/3591* (2013.01)

(58) Field of Classification Search
USPC ........................................ 348/396; 250/208.1
See application file for complete search history.

(56) References Cited

U.S. PATENT DOCUMENTS

| 7,514,716 | B2 | 4/2009 | Panicacci |
| 8,013,931 | B2 | 9/2011 | Abiru et al. |
| 8,026,967 | B2 | 9/2011 | Shah |
| 8,031,246 | B2 | 10/2011 | Makino et al. |
| 8,077,238 | B2 | 12/2011 | Hong et al. |
| 8,093,541 | B2 * | 1/2012 | Chen .......................... 250/208.1 |
| 8,114,718 | B2 | 2/2012 | Xu et al. |
| 2010/0097508 | A1 | 4/2010 | Yanagita et al. |
| 2010/0182469 | A1 | 7/2010 | Takamiya et al. |
| 2012/0235021 | A1 | 9/2012 | Kasai |

* cited by examiner

*Primary Examiner* — Anthony J Daniels
(74) *Attorney, Agent, or Firm* — Harness, Dickey & Pierce, P.L.C.

(57) ABSTRACT

An image sensor includes a line driver, which further includes a transfer pulse generating circuit. The transfer pulse generating circuit is configured to determine an integration status of a first group of pixels, and to selectively apply the anti-blooming shutter to the first group of pixels based on the determined integration status of the first group of pixels.

9 Claims, 9 Drawing Sheets

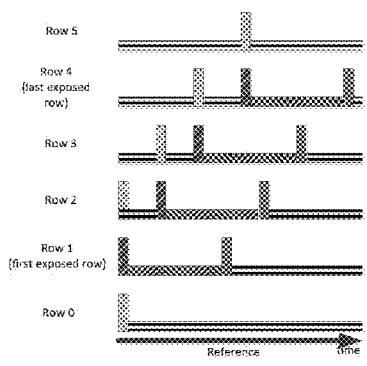
FIG. 7A
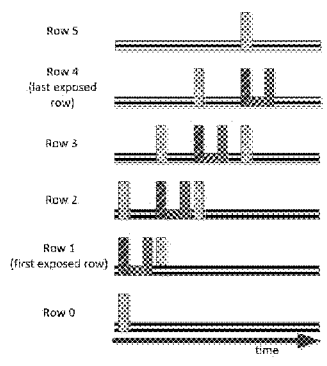
FIG. 7B
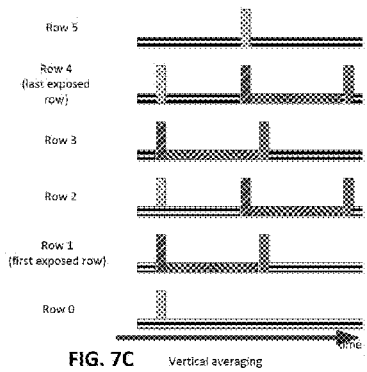
FIG. 7C  Vertical averaging
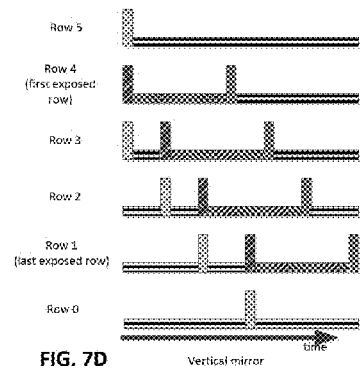
FIG. 7D  Vertical mirror
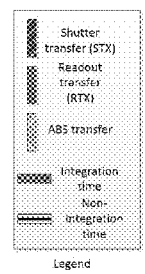
Legend

ANTI-BLOOMING SHUTTER CONTROL IN IMAGE SENSORS

BACKGROUND

An image sensor converts an optical image into an electrical signal. Types of image sensors include charge-coupled devices (CCDs) and complementary-metal-oxide-semiconductor (CMOS) image sensors. Image sensors are commonly used in digital cameras as well as other imaging devices.

Conventional image sensors include pixels arranged in a plurality of rows and columns. Each pixel includes a photo sensor that accumulates charge when illuminated by light. Conventionally, pixels accumulate a charge in an analog circuit for a continuous period of time referred to as an integration time (also referred to as an exposure time). The accumulated charge is transferred to an analog-to-digital (A/D) converter, which converts the accumulated charge into a digital value for that pixel.

When a photo sensitive device is over exposed (i.e., exposed to more photons than the device is able to absorb and convert into electrons), the excess electrons may flow into adjacent pixels, which results in a halo effect around bright pixels. This is commonly referred to as blooming. Blooming can be a problem in conventional CMOS image sensors under conditions of relatively high illumination, in shared pixel structures, and in image sensors utilizing an electronic rolling shutter.

Blooming can also be an issue in conventional boundary or skipping cases where pixels that are not read out continue to accumulate charge continuously even under low illumination conditions. In this case, these pixels have a relatively high blooming risk.

In a shared pixel, for example, two or mode photodiodes and transfer transistors share the remaining portion of the pixel circuitry. In this case, there is a (relatively) low impedance flow path for electrons between the photodiodes. Consequently, blooming may occur more easily.

In an image sensor utilizing an electronic rolling shutter, when the image sensor is exposed to relatively high illumination, the exposure time of the pixels may be set to a relatively short value to avoid saturation in the image. However, the non-integration time (NIT), also referred to as non-exposure time, becomes longer if frame time is a constant—as is typical for video cameras. Since pixels continue to collect electrons even during NIT time, the pixels may become saturated and bloom into neighboring pixels.

If some of a scene includes bright regions adjacent to dark regions, the blooming from the bright pixels into the dark region may be relatively visible resulting in decreased image quality.

SUMMARY

Example embodiments provide anti-blooming methods, apparatuses and image sensors. Example embodiments include an electronic rolling shutter. In methods according to example embodiments, an anti-blooming shutter circuit automatically recognizes rows in the sensor are being exposed. The shutter pulse of adjacent rows may be applied to a given row, when the given row is not being exposed to reduce the effect of blooming.

At least some example embodiments provide methods and apparatus for automatic application of anti-blooming shutter in image sensors. Methods and apparatuses are suitable for electronic rolling shutter applications. Methods and apparatuses may reduce (e.g., significantly reduce) the complexity of control of the sensor.

Example embodiments may also be applied, with little or no side effects, in cases where different sections of the sensor are exposed non-uniformly, for example when pixels of each color channels have different exposures, or for wide-dynamic range applications where some pixels are exposed for long times and some for relatively short times. Also, example embodiments do not depend on implementation of complex scanning schemes, for example, simultaneous readout of two or more rows, diverse binning/skipping modes, etc.

In addition to simplifying hardware and/or software, example embodiments may also make it easier to validate methods and apparatuses because all of the relevant circuitry is located within the line control logic.

At least one example embodiment provides a line driver of an image sensor. According to at least this example embodiment, the line driver includes: at least a first transfer pulse generating circuit configured to determine an integration status of a first group of pixels, and to selectively apply an anti-blooming shutter to the first group of pixels based on the determined integration status of the first group of pixels.

At least one other example embodiment provides an image sensor including: a pixel array including the first group of pixels; and a line driver configured to select groups of pixels for output by the active pixel array. The line driver includes: at least a first transfer pulse generating circuit configured to determine an integration status of a first group of pixels, and to selectively apply an anti-blooming shutter to the first group of pixels based on the determined integration status of the first group of pixels.

At least one other example embodiment provides a digital imaging system including: a processor configured to process captured image data; and an image sensor configured to capture image data by converting optical images into electrical signals. The image sensor includes: a pixel array including the first group of pixels; and a line driver configured to select groups of pixels for output by the active pixel array. The line driver includes: at least a first transfer pulse generating circuit configured to determine an integration status of a first group of pixels, and to selectively apply an anti-blooming shutter to the first group of pixels based on the determined integration status of the first group of pixels.

According to at least some example embodiments, the first transfer pulse generating circuit may be further configured to apply the anti-blooming shutter to the first group of pixels in response to a shutter transfer pulse associated with a second group of pixels when the first group of pixels is in non-integration time.

The first transfer pulse generating circuit may correspond to the first group of pixels, and the line driver may further include: a second transfer pulse generating circuit corresponding to the second group of pixels, the second transfer pulse generating circuit being configured to output the shutter transfer pulse to the first transfer pulse generating circuit. The first group of pixels may correspond to a first line of a pixel array, and the second group of pixels may correspond to a second line of the pixel array.

The first line and the second line may be adjacent to one another.

The first transfer pulse generating circuit may include: a first anti-blooming shutter control circuit configured to determine the integration status of the first group of pixels based on a transfer pulse corresponding to the first group of pixels, the transfer pulse being one of a readout transfer pulse and a shutter transfer pulse corresponding to the first group of pixels. The first anti-blooming shutter control circuit may be configured to store the integration status of the first group of pixels.

The first anti-blooming shutter control circuit may include: a storage circuit configured to store the integration status of the first group of pixels; and a logic circuit configured to generate an anti-blooming shutter control pulse based on the stored integration status and an integration status of a second group of pixels.

The logic circuit may be configured to determine the integration status of the second group of pixels based on a shutter transfer pulse corresponding to the second group of pixels. The storage circuit may be an SR latch.

The first anti-blooming shutter control circuit may be configured to prevent application of the anti-blooming shutter to the first group of pixels during integration of the first group of pixels.

The first anti-blooming shutter control circuit may be further configured to generate a first anti-blooming shutter control pulse based on the transfer pulse corresponding to the first group of pixels and at least one shutter transfer pulse corresponding to a second group of pixels, and the first transfer pulse generating circuit may further include: a transfer pulse output circuit configured to selectively output the anti-blooming shutter to the first group of pixels based on the first anti-blooming shutter control pulse.

The first transfer pulse generating circuit may be configured to apply the anti-blooming shutter only during non-integration time.

At least one other example embodiment provides a line driver of an image sensor. According to at least this example embodiment, the line driver includes: at least a first transfer pulse generating circuit configured to determine an access status of a first group of pixels, and to selectively apply an anti-blooming shutter to the first group of pixels based on the determined access status of the first group of pixels.

At least one other example embodiment provides an image sensor. According to at least this example embodiment, the image sensor includes: a pixel array including the first group of pixels; and a line driver configured to select groups of pixels for output by the active pixel array. The line driver includes: at least a first transfer pulse generating circuit configured to determine an access status of a first group of pixels, and to selectively apply an anti-blooming shutter to the first group of pixels based on the determined access status of the first group of pixels.

At least one other example embodiment provides a digital imaging system including: a processor configured to process captured image data; and an image sensor configured to capture image data by converting optical images into electrical signals. The image sensor includes: a pixel array including the first group of pixels; and a line driver configured to select groups of pixels for output by the active pixel array. The line driver includes: at least a first transfer pulse generating circuit configured to determine an access status of a first group of pixels, and to selectively apply an anti-blooming shutter to the first group of pixels based on the determined access status of the first group of pixels.

According to at least some example embodiments, the access status may be indicative of: whether the first group of pixels has been at least one of integrated and readout; whether at least one of a shutter transfer pulse and a readout pulse has been applied to the first group of pixels; and/or whether at least one of integration and readout of the first group of pixels is disabled.

The first transfer pulse generating circuit may be further configured to apply the anti-blooming shutter to the first group of pixels if the at least one of the integration and readout of the first group of pixels is disabled.

The first transfer pulse generating circuit may be further configured to apply the anti-blooming shutter to the first group of pixels in response to a shutter transfer pulse associated with a second group of pixels.

The first transfer pulse generating circuit may correspond to the first group of pixels, and the line driver may further include: a second transfer pulse generating circuit corresponding to the second group of pixels, the second transfer pulse generating circuit being configured to output the shutter transfer pulse to the first transfer pulse generating circuit.

The first group of pixels may be a first line of a pixel array, and the second group of pixels may be a second line of the pixel array. The first line and the second line may be adjacent to one another.

The first transfer pulse generating circuit may include: a first anti-blooming shutter control circuit configured to determine the access status of the first group of pixels based on an access disable signal corresponding to the first group of pixels, the access disable signal disabling at least one of integration and readout of the first group of pixels.

The first transfer pulse generating circuit may be further configured to determine an integration status of the first group of pixels, and to apply the anti-blooming shutter to the first group of pixels in response to a shutter transfer pulse associated with a second group of pixels when the first group of pixels is in non-integration time.

At least one other example embodiment provides a method of operating a line driver of an image sensor. According to at least this example embodiment, the method includes: determining, at a first transfer pulse generating circuit, an integration status of a first group of pixels; and selectively applying an anti-blooming shutter to the first group of pixels based on the determined integration status of the first group of pixels.

At least one other example embodiment provides a method of operating a line driver of an image sensor. According to at least this example embodiment, the method includes: determining, at a first transfer pulse generating circuit, an access status of a first group of pixels; and selectively applying an anti-blooming shutter to the first group of pixels based on the determined access status of the first group of pixels.

BRIEF DESCRIPTION OF THE DRAWINGS

Example embodiments will become more appreciable through the description of the drawings in which:

FIGS. 7A through 7D show example pulse sequence diagrams for illustrating example timing of readout pulses, shutter pulses and anti-blooming shutter pulses applied to lines of a pixel array;

DETAILED DESCRIPTION

Figure 1:
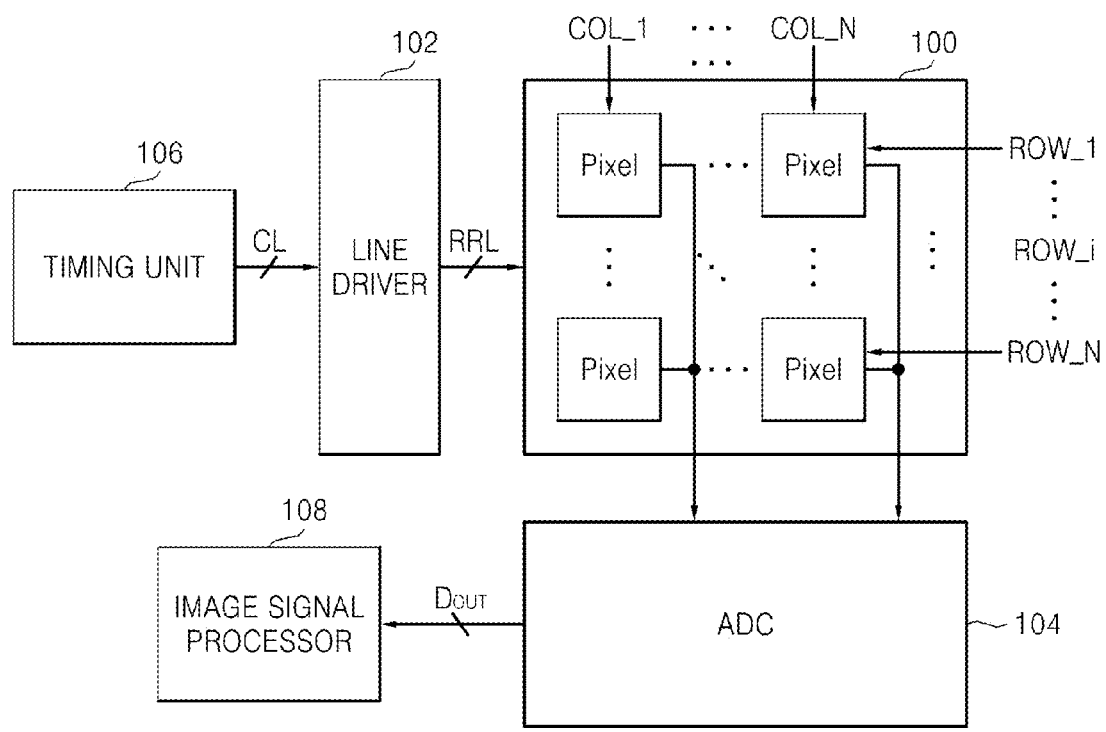
FIG. 1 is a block diagram of an image sensor according to an example embodiment.

Example embodiments will now be described more fully with reference to the accompanying drawings. Many alternate forms may be embodied and example embodiments should not be construed as limited to example embodiments set forth herein. In the drawings, the thicknesses of layers and regions may be exaggerated for clarity, and like reference numerals refer to like elements.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Example embodiments provide apparatuses, logic circuits, line drivers, image sensors and imaging systems configured to apply an anti-blooming shutter (ABS) to lines of a pixel array. Example embodiments also provide methods for applying an anti-blooming shutter. A shutter (or shutter pulse) is a transfer pulse that is used to empty a photodiode at the beginning of exposure (or integration) of the photodiode. An anti-blooming shutter is applied by simultaneously emptying adjacent or closely positioned photodiodes together with the photodiodes being exposed, thereby reducing the likelihood that adjacent pixels are saturated at the beginning of integration time.

According to at least one example embodiment, a transfer pulse generating circuit is configured to determine an integration status of a first group of pixels, and to selectively apply an anti-blooming shutter to the first group of pixels based on the determined integration status of the first group of pixels.

According to at least one other example embodiment, a transfer pulse generating circuit is configured to determine an access status of the first group of pixels, and to selectively apply the anti-blooming shutter to the first group of pixels based on the determined access status of the first group of pixels.

In case of an electronic rolling shutter, the shutter is applied line-by-line, and therefore, the ABS may be applied to adjacent lines above or below the line to be integrated. According to example embodiments, the ABS is applied only to pixels that are not currently in integration time (IT); that is, to those pixels that are not currently being exposed or integrated.

One or more example embodiments provide methods, apparatuses and imaging systems in which ABS is automatically applied only to lines that are not currently in integration time. According to at least some example embodiments, an ABS control circuit may be implemented in the logic circuitry of the line driver of an image sensor as will be discussed in more detail later.

Since each exposure of a group of pixels begins with a shutter transfer pulse (STX), and ends with a readout transfer pulse (RTX), the line driver is able to determine whether a given group of pixels is currently being exposed, and then selectively apply ABS to a given group of pixels concurrently and/or simultaneously when applying a shutter pulse to an adjacent or closely positioned group of pixels. In one example, the line driver may apply an anti-blooming shutter to a given group of pixels in response to a shutter pulse intended for another group of pixels of the pixel array.

According to at least one example embodiment, the line driver includes an anti-blooming shutter control circuit corresponding to each line of the pixel array. Each anti-blooming shutter control circuit includes a storage circuit (e.g., a latch circuit such as an RS flip flop) that stores an integration status of the corresponding line of the pixel array. In this case, the storage circuit remembers whether the given line is in integration time IT (e.g., IT='1', NIT='0') or in non-integration time NIT (e.g., IT='0', NIT='1'). The latch is set (e.g., IT set to '1' and NIT set to '0') in response to a shutter transfer pulse and reset (e.g., IT set to '0' and NIT set to '1') in response to a readout transfer pulse.

FIG. 1 illustrates a complementary-metal-oxide-semiconductor (CMOS) image sensor according to an example embodiment.

Referring to FIG. 1, a timing unit or circuit 106 controls a line driver 102 through one or more control lines CL. In one example, the timing unit 106 causes the line driver 102 to generate a plurality of transfer pulses (e.g., readout, shutter and/or anti-blooming shutter pulses). The line driver 102 outputs the transfer pulses to a pixel array 100 over a plurality of read and reset lines RRL.

The pixel array 100 includes a plurality of pixels arranged in an array of rows ROW_1-ROW_N and columns COL_1-COL_N. As discussed herein, rows and columns may be collectively referred to as lines. Each of the plurality of read and reset lines RRL corresponds to a line of pixels in the pixel array 100. In FIG. 1, each pixel may be an active-pixel sensor (APS), and the pixel array 100 may be an APS array.

Although example embodiments may be discussed herein with regard to lines (e.g., rows and/or columns) of a pixel array, it should be understood that the same principles may be applied to pixels grouped in any manner.

In more detail with reference to example operation of the image sensor in FIG. 1, transfer pulses for an i-th line ROW_i (where i={1, . . . , N}) of the pixel array 100 are output from the line driver 102 to the pixel array 100 via an i-th one of the read and reset lines RRL. In one example, the line driver 102 applies a shutter transfer pulse to the i-th line ROW_i of the pixel array 100 to begin an exposure period (integration time). After a given, desired or predetermined exposure time, the line driver 102 applies a readout transfer pulse to the same i-th line ROW_i of the pixel array 100 to end the exposure period. The application of the readout transfer pulse also initiates reading out of pixel information (e.g., exposure data) from the pixels in the i-th line ROW_i.

As discussed in more detail below, the line driver 102 may also output anti-blooming shutter pulses to respective lines of the pixel array 100.

The analog-to-digital converter (ADC) 104 converts the output voltages from the i-th line ROW_i of readout pixels into a digital signal (or digital data). The ADC 104 may perform this conversion either serially or in parallel. An ADC 104 (e.g., having a column parallel-architecture) converts the output voltages into a digital signal (e.g., in parallel). The ADC 104 then outputs the digital data (or digital code) $D_{OUT}$ to a next stage processor such as an image signal processor (ISP) 108, which processes the digital data $D_{OUT}$ to generate an image. In one example, the ISP 108 may also perform image processing operations on the digital data including, for example, gamma correction, auto white balancing, application of a color correction matrix (CCM), and handling chromatic aberrations.

Figure 2:
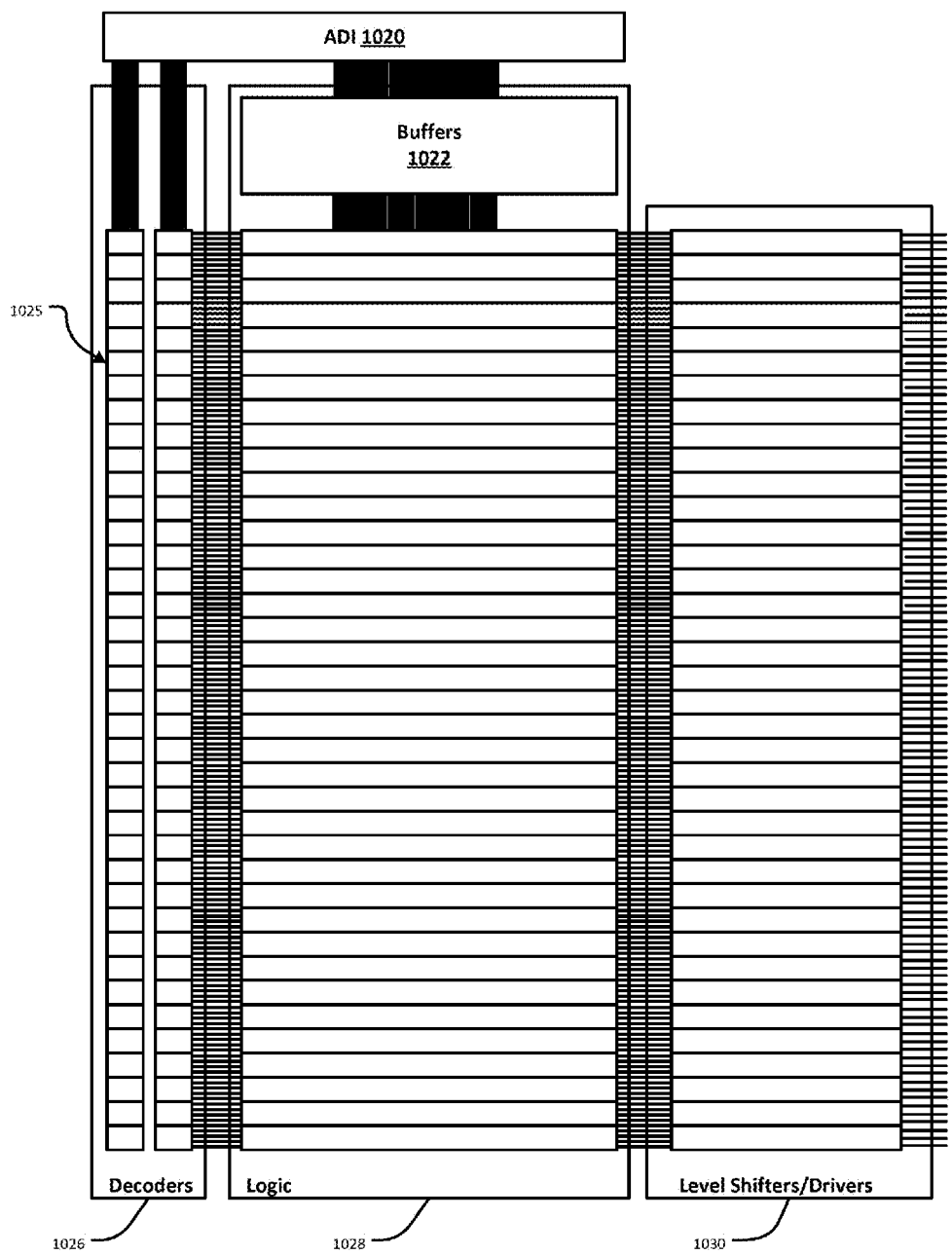
FIG. 2 illustrates an example embodiment of the line driver 102 show in FIG. 1.

FIG. 2 illustrates an example embodiment of the line driver 102 shown in FIG. 1.

Referring to FIG. 2, the line driver 102 includes an analog digital interface (ADI) buffer 1020 to buffer digital input signals from the timing circuit 106 (FIG. 1). The ADI buffer 1020 outputs the buffered digital input signals to a decoder circuit 1026 and a logic circuit 1028.

The decoder circuit 1026 includes decoders 1025. The decoder circuit 1026 is configured to generate row-select line and pulse signals based on vertical address information from the ADI buffer 1020. The decoder circuit 1026 includes a plurality of decoders 1025. In one example, the decoder circuit 1026 includes a decoder 1025 per line of the pixel array 100.

The decoder circuit 1026 outputs row-select line and pulse signals to the logic circuit 1028.

The logic circuit 1028 converts row-select line and pulse signals (in this case for vertical lines) into TG, RG, SEL, etc. signals. The logic circuit 1028 also receives transfer pulses (e.g., readout and shutter transfer pulses) from the ADI buffer 1020, which are further buffered at the buffer 1022 before being input into the logic circuit 1028. The logic circuit 1028 outputs transfer pulses to the level shifter/driver circuit 1030 based on readout row select signals from the decoders 1025 and readout and shutter transfer pulses from the buffers 1022.

The level shifter/driver circuit 1030 includes a level shifter/driver for each line of the pixel array 100. The level shifter/driver circuit 1030 converts the digital signals from the logic circuit 1028 into pixel voltage levels. The level shifter/driver circuit 1030 outputs pixel voltage levels to corresponding lines of the pixel array 100.

Although the level shifter/driver circuit 1030 is positioned between the logic circuit 1028 and the pixel array 100, example embodiments will be discussed with regard to the logic circuit 1028 outputting transfer pulses to the pixel array 100 for the sake of clarity.

Figure 3:
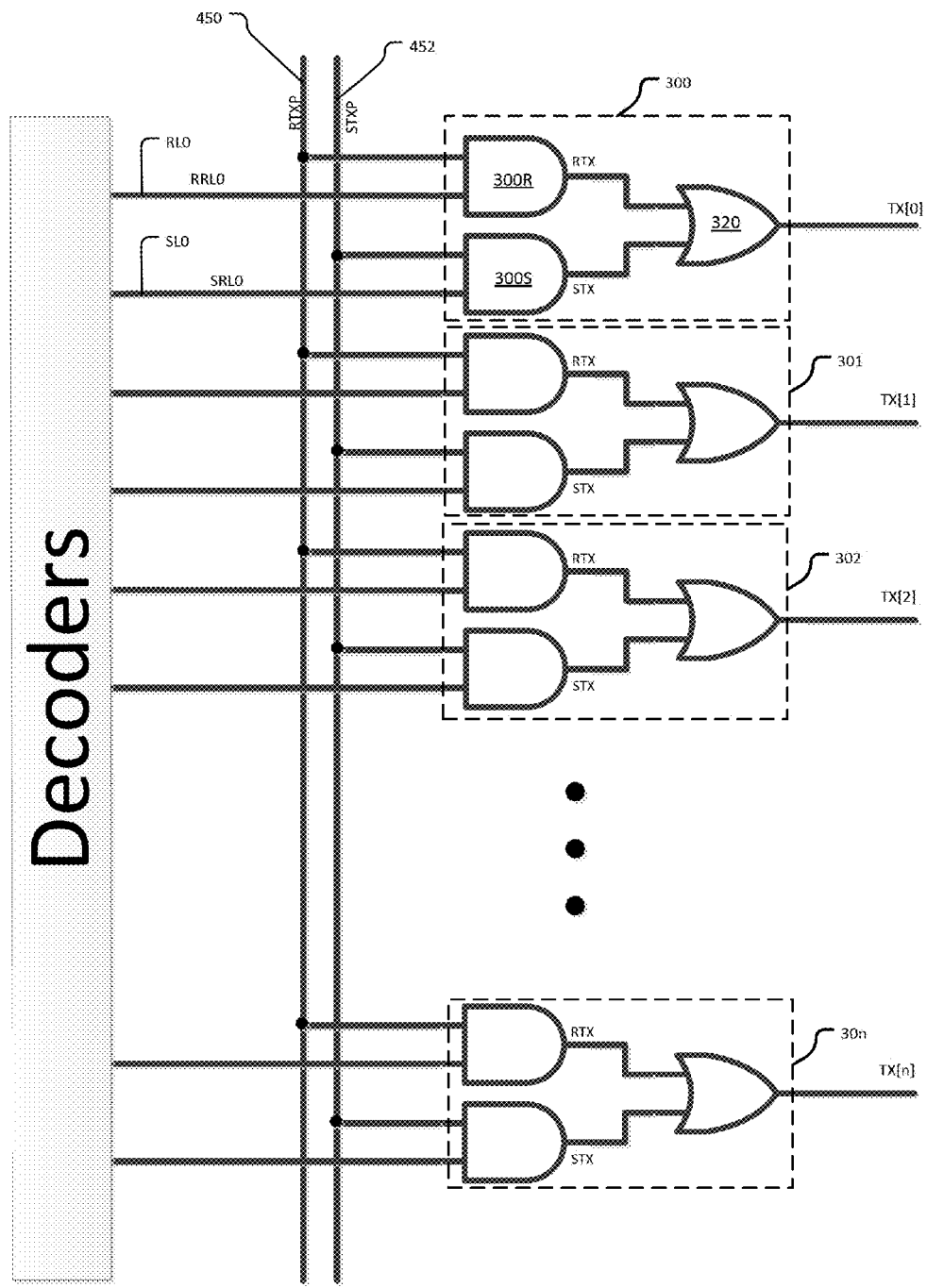
FIG. 3 illustrates an example configuration of a conventional line logic circuit related to transfer.

FIG. 3 illustrates a conventional configuration of the logic circuit 1028.

Referring to FIG. 3, the conventional logic circuit 1028 includes a plurality of transfer pulse generating circuits 300 through 30n. Each of the plurality of transfer pulse generating circuits 300 through 30n corresponds to a line of the pixel array 100, and includes two AND gates and an OR gate for each line of the pixel array.

In the example shown in FIG. 3, a first transfer pulse generating circuit 300 includes AND gates 300R and 300S. The AND gate 300R performs a logical AND operation between a readout row select signal RRL0 from the decoder circuit 1026 and the readout transfer pulse RTXP from the buffers 1022 to generate a readout transfer pulse RTX. The AND gate 300R outputs the readout transfer pulse RTX to the OR gate 320.

The AND gate 300S performs a logical AND operation between a shutter row select signal SRL0 from the decoder circuit 1026 and the shutter transfer pulse STXP from the buffers 1022 to generate a shutter transfer pulse STX. The AND gate 300S outputs the shutter transfer pulse STX to the OR gate 320.

The OR gate 320 performs a logical OR operation between the readout transfer pulse RTX and the shutter transfer pulse STX to generate a first transfer pulse TX[0], which is output to the first line of the pixel array 100.

Each of the transfer pulse generating circuits 301, 302, . . . , 30n operates in the same manner as the first transfer pulse generating circuit 300, but with regard to corresponding readout row and shutter row select signals. Thus, a detailed discussion of these additional components in FIG. 3 is omitted.

Figure 4:
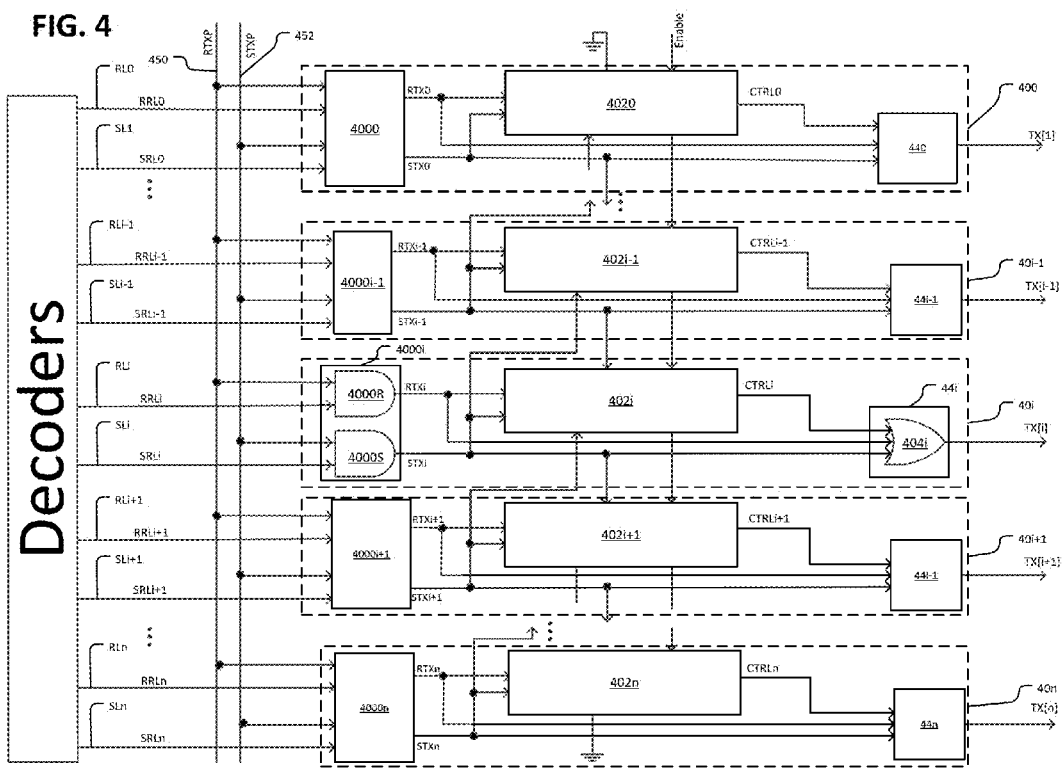
FIG. 4 illustrates an example embodiment of the line logic circuit 1028 portion of the line driver shown in FIG. 2.

FIG. 4 illustrates an example embodiment of the logic circuit 1028 shown in FIG. 2. As shown, the logic circuit 1028 includes transfer pulse generating circuits and anti-blooming shutter control circuits according to example embodiments.

In the example embodiment shown in FIG. 4, the logic circuit 1028 includes a plurality of transfer pulse generating circuits 400, 40i−1, 40i, 40i+1, . . . , 40n. Each of the plurality of transfer pulse generating circuits 400, 40i−1, 40i, 40i+1, . . . , 40n corresponds to a line of the pixel array 100 shown in FIG. 1.

As shown in FIG. 4, each of the plurality of transfer pulse generating circuits 400, 40i−1, 40i, 40i+1, . . . , 40n includes a shutter and readout pulse generating circuit, an anti-blooming shutter control circuit, and a transfer pulse output circuit.

The transfer pulse generating circuits are configured to determine an integration status of a corresponding group of pixels (e.g., a line of pixels of the pixel array 100), and to selectively apply an anti-blooming shutter to the corresponding group of pixels based on the determined integration status.

In more detail, the transfer pulse generating circuit 400 includes a shutter and readout pulse generating circuit 4000, an anti-blooming shutter control circuit 4020, and a transfer pulse output circuit 440.

The transfer pulse generating circuit 40i−1 includes a shutter and readout pulse generating circuit 4000i−1, an anti-blooming shutter control circuit 402i−1, and a transfer pulse output circuit 44i−1.

The transfer pulse generating circuit 40i includes a shutter and readout pulse generating circuit 4000i, an anti-blooming shutter control circuit 402i, and a transfer pulse output circuit 44i.

The transfer pulse generating circuit 40i+1 includes a shutter and readout pulse generating circuit 4000i+1, an anti-blooming shutter control circuit 402i+1, and a transfer pulse output circuit 44i+1.

The transfer pulse generating circuit 40n includes a shutter and readout pulse generating circuit 4000n, an anti-blooming shutter control circuit 402n, and a transfer pulse output circuit 44n.

For the sake of clarity, the example embodiment shown in FIG. 4 will be described with regard to the i-th transfer pulse generating circuit 40i, which corresponds to the i-th line ROW_i of the pixel array 100. It should be understood that each of the plurality of transfer pulse generating circuits 40i−1, 40i, 40i+1 operates in the same or substantially the same manner, but with regard to a corresponding line of the pixel array 100. Transfer pulse generating circuits 400 and 40n correspond to a top and bottom line of the pixel array 100. The transfer pulse generating circuits 400 and 40n also operate in a manner similar to that described with regard to transfer pulse generating circuit 40i, except that the transfer pulse generating circuits 400 and 40n output internal shutter pulses to only one adjacent transfer pulse generating circuit, and receive only one shutter transfer pulse from that adjacent transfer pulse generating circuit.

As mentioned above, the i-th transfer pulse generating circuit 40i includes a shutter and readout pulse generating circuit 4000i, an anti-blooming shutter control circuit 402i, and a transfer pulse output circuit 44i.

The shutter and readout pulse generating circuit 4000i generates an internal readout transfer pulse RTXi based on a received readout row select signal RRLi and a received readout transfer pulse RTXP. The shutter and readout pulse generating circuit 4000i outputs the internal readout transfer pulse RTXi to the anti-blooming shutter control circuit 402i and the transfer pulse output circuit 44i.

The shutter and readout pulse generating circuit 4000i also generates an internal shutter transfer pulse STXi based on a received shutter row select signal SRLi and the received shutter transfer pulse STXP. The shutter and readout pulse generating circuit 4000i outputs the internal shutter transfer pulse STXi to the anti-blooming shutter control circuit 402i and the transfer pulse output circuit 44i.

According to at least some example embodiments, the anti-blooming shutter control circuit 402i determines the integration status of the i-th line ROW_i of the pixel array 100 based on the internal readout transfer pulse RTXi and/or the internal shutter transfer pulse STXi corresponding to the i-th line ROW_i of the pixel array 100. The internal readout transfer pulse RTXi and/or the internal shutter transfer pulse STXi are indicative of an integration status of the i-th line ROW_i.

The anti-blooming shutter control circuit 402i generates an anti-blooming shutter control pulse CTRLi based on the determined integration status (e.g., internal readout transfer pulse RTXi and/or the internal shutter transfer pulse STXi) and one or more of internal shutter transfer pulses STXi−1 and STXi+1 from shutter and readout pulse generating circuits 4000i−1 and 4000i+1, respectively. The internal shutter transfer pulses STXi−1 and STXi+1 correspond to respective lines ROW_i−1 and ROW_i+1 of the pixel array 100. The anti-blooming shutter control circuit 402i outputs the anti-blooming shutter control pulse CTRLi to the transfer pulse output circuit 44i.

The transfer pulse output circuit 44i generates and outputs a transfer pulse TX[i] in response to the internal readout transfer pulse RTXi, the internal shutter transfer pulse STXi and/or the anti-blooming shutter control pulse CTRLi. In this example, the transfer pulse TX[i] is one of a shutter pulse, a readout pulse and an anti-blooming shutter pulse. The transfer pulse output circuit 44i outputs the transfer pulse TX[i] to the i-th line ROW_i of the pixel array 100.

In the example embodiment shown in FIG. 4, the anti-blooming shutter control circuit 402i controls application of an anti-blooming shutter (ABS) to the i-th line ROW_i of the pixel array 100. For example, the anti-blooming shutter control circuit 402i enables application of the anti-blooming shutter (ABS) concurrently or simultaneously with application of a shutter pulse to one or more of adjacent lines ROW_i−1 and ROW_i+1. The anti-blooming shutter control circuit 402i also prevents application of the anti-blooming shutter to the i-th line ROW_i of the pixel array 100 while the i-th line ROW_i of the pixel array 100 is being integrated and/or exposed. Thus, the anti-blooming shutter control circuit 402i ensures that an anti-blooming shutter is applied to the i-th line ROW_i only during non-integration time.

The internal shutter transfer pulses STXi−1 and STXi+1 for adjacent lines ROW_i−1 and ROW_i+1 of the pixel array 100 are applied to respective lines of the pixel array 100 to start exposure of these lines. Thus, the internal shutter transfer pulses STXi−1 and STXi+1 are indicative of an integration status of respective lines ROW_i−1 and ROW_i+1. That is, for example, the internal shutter transfer pulses STXi−1 and STXi+1 are indicative of whether respective lines ROW_i−1 and ROW_i+1 are currently in integration time. Similarly, the i-th internal shutter transfer pulse STXi is indicative of whether the i-th line ROW_i of the pixel array 100 is in integration time.

Figure 5:
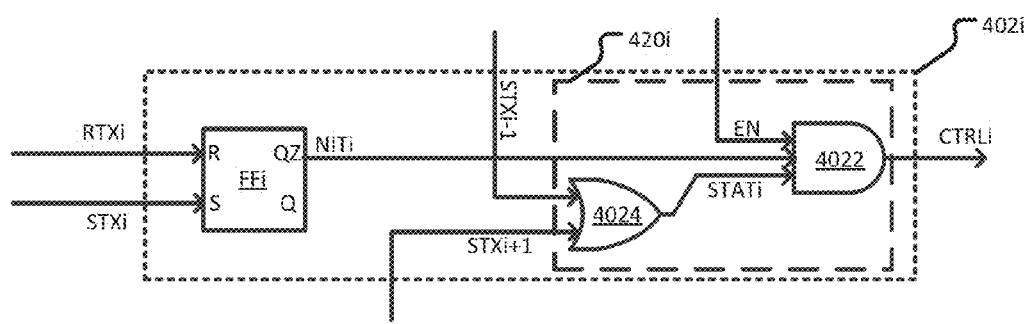
FIG. 5 illustrates an example embodiment of an anti-blooming shutter control circuit in more detail.

FIG. 5 illustrates an example embodiment of the anti-blooming shutter control circuit 402i shown in FIG. 4. As shown, the anti-blooming shutter control circuit 402i includes a storage circuit FFi (also referred to herein as a latch circuit) and a logic circuit 420i. The logic circuit 420i includes an OR gate 4024 and an AND gate 4022. In this example, the storage or latch circuit FFi is a RS flip-flop. Because flip-flops such as this are well-known, a detailed discussion is omitted. Although the latch circuit FFi is illustrated as an RS flip-flop in FIG. 5, example embodiments are not limited to this example. Rather, any storage or latch circuit with similar functionality may be used. As discussed herein, the storage circuit FFi is referred to as a latch circuit FFi.

Referring to FIG. 5, the latch circuit FFi determines and stores an integration status of the i-th line ROW_i of the pixel array 100 based on the internal shutter transfer pulse STXi and the internal readout transfer pulse RTXi. The latch circuit FFi selectively enables and disables a pixel integration status signal NITi based on the stored integration status.

The logic circuit 420i generates the anti-blooming shutter control pulse CTRLi based on the integration status of the i-th line ROW_i of the pixel array 100 and an integration status of at least one of the lines ROW_i−1 and ROW_i+1 of the pixel array 100. In more detail, for example, the logic circuit 420i generates the anti-blooming shutter control pulse CTRLi based on the pixel integration status signal NITi and the internal shutter transfer pulses STXi−1 and STXi+1 for adjacent lines ROW_i−1 and ROW_i+1, respectively.

Within the logic circuit 420i, the OR gate 4024 outputs an adjacent shutter status pulse STATi to the AND gate 4022 based on the internal shutter transfer pulses STXi−1 and STXi+1 for adjacent lines ROW_i−1 and ROW_i+1. The AND gate 4022 outputs the anti-blooming shutter control signal CTRLi in response to the adjacent shutter status pulse STATi, the pixel integration status signal NITi and an enable signal EN. The enable signal EN is a signal, which may be static or dynamic. The enable signal EN allows for a user to enable or disable the anti-blooming shutter control the pixel array 100. In one example, the enable signal EN may be shared among all lines of the pixel array 100. In this example, the enable signal EN allows for a user to enable or disable the anti-blooming shutter control for the entire pixel array 100. However, example embodiments are not limited to this example. In an alternative example, anti-blooming shutter control may be enabled or disabled on a line-by-line basis.

A more detailed discussion of the example embodiment shown in FIGS. 4 and 5 will now be provided. However, it should be understood that example embodiments are not limited to this example logic circuit.

Moreover, the more detailed discussion will be provided first with regard to a situation in which an enabled shutter row select signal SRLi and shutter transfer pulse STXP are provided to the transfer pulse generating circuit 4000*i*, and then with regard to a situation in which an enabled readout row select signal RRLi and readout transfer pulse RTXP are provided to the transfer pulse generating circuit 4000*i*.

As shown in FIG. 4, the shutter and readout pulse generating circuit 4000*i* includes a readout AND gate 4000R and a shutter AND gate 4000S. The transfer pulse output circuit 44*i* includes an OR gate 404*i*.

When the decoder circuit 1026 receives a shutter command along with an address (e.g., VAD) corresponding to the i-th line ROW_i of the pixel array 100, the decoder circuit 1026 enables the shutter row select signal SRLi for a given, desired or predetermined time interval. The decoder circuit 1026 outputs the enabled shutter row select signal SRLi to the shutter AND gate 4000S via the shutter row select line SLi.

During this time interval, when the shutter AND gate 4000S receives a shutter transfer pulse STXP on the shutter transfer pulse line 452, the shutter AND gate 4000S outputs the internal shutter transfer pulse STXi to the anti-blooming shutter control circuit 402*i* and the transfer pulse output circuit 44*i*.

Turning to FIG. 5, in response to the internal shutter transfer pulse STXi, the latch circuit FFi stores the non-integration status of the i-th line ROW_i and disables a pixel integration status signal NITi for the i-th line ROW_i. The latch circuit FFi outputs the disabled pixel integration status signal NITi for the i-th row ROW_i to the logic circuit 420*i*. The disabled pixel integration status signal NITi indicates that the i-th line ROW_i is in integration time, and prevents application of the anti-blooming shutter to the i-th line ROW_i during integration. In this case, the internal shutter transfer pulses STXi−1 and STXi+1 and the adjacent shutter status pulse STATi may be ignored because the pixel integration status signal NITi is disabled.

Referring back to FIG. 4, in response to the internal shutter transfer pulse STXi, the OR gate 404*i* outputs a transfer pulse TX[i] to the i-th line ROW_i of the pixel array 100. In this case, the transfer pulse TX[i] is a shutter transfer pulse initiating integration of the i-th line ROW_i of the pixel array 100.

Still referring to FIG. 4, when the decoder circuit 1026 receives a readout command along with an address corresponding to the i-th line ROW_i of the pixel array 100, the decoder circuit 1026 enables the readout row select signal RRLi for a given, desired or predetermined time interval. The decoder circuit 1026 outputs the enabled readout row select signal RRLi to the readout AND gate 4000R via the readout row select line RLi.

During this time interval, when the readout AND gate 4000R receives a readout transfer pulse RTXP on the readout transfer pulse line 450, the readout AND gate 4000R outputs an internal readout transfer pulse RTXi to the anti-blooming shutter control circuit 402*i* and the transfer pulse output circuit 44*i*.

In response to the internal readout transfer pulse RTXi, the OR gate 404*i* outputs a transfer pulse TX[i]. In this case, the transfer pulse TX[i] is a readout transfer pulse RTX initiating readout of the i-th line ROW_i of the pixel array 100.

Referring again to FIG. 5, in response to the internal readout transfer pulse RTXi, the latch circuit FFi enables the pixel integration status signal NITi for the i-th line ROW_i. The latch circuit FFi outputs the enabled pixel integration status signal NITi for the i-th row ROW_i to the logic circuit 420*i*. The enabled pixel integration status signal NITi indicates that the i-th line ROW_i is not in integration time (i.e., is in non-integration time). The enabled pixel integration status signal NITi allows for anti-blooming shutter pulses to be applied to the i-th line ROW_i of the pixel array 100 when shutter transfer pulses are applied to adjacent lines ROW_i−1 and/or ROW_i+1 of the pixel array 100. In this regard, anti-blooming shutter pulses may be applied to the i-th line ROW_i of the pixel array 100 concurrently and/or simultaneously with application of shutter transfer pulses to adjacent lines ROW_i−1 and/or ROW_i+1.

The latch circuit FFi continues to output the enabled integration status signal NITi while the i-th line ROW_i is not being integrated and/or exposed. In other words, the latch circuit FFi continues to output the enabled pixel integration status signal NITi until receiving a subsequent internal shutter transfer pulse STXi from the shutter and readout transfer pulse generating circuit 4000*i*.

While the pixel integration status signal NITi and the enable signal EN are enabled, the anti-blooming shutter control circuit 402*i* outputs the anti-blooming shutter control pulse CTRLi in response to the internal shutter transfer pulse STXi−1 and/or the internal shutter transfer pulse STXi+1 for adjacent lines ROW_i−1 and ROW_i+1 of the pixel array 100.

The transfer pulse output circuit 44*i* (in FIG. 5 the OR gate 404*i*) generates a transfer pulse TX[i] in response to the anti-blooming shutter control pulse CTRLi from the anti-blooming shutter control circuit 402*i*. In this case, the transfer pulse TX[i] is an anti-blooming shutter.

According to at least this example embodiment, the disabling of the non-integration time signal NITi when the i-th line ROW_i of the pixel array 100 is being integrated prevents application of an anti-blooming shutter to the i-th line ROW_i of the pixel array 100 during exposure of the i-th line ROW_i of the pixel array 100.

Because the non-integration time signal NITi is enabled when the i-th line ROW_i of the pixel array 100 is not being integrated and the enable signal EN is enabled, the anti-blooming control circuit 402*i* outputs the anti-blooming shutter control pulse CTRLi in response to the internal shutter transfer pulse STXi−1 and/or the internal shutter transfer pulse STXi+1. The anti-blooming shutter control pulse CTRLi output from the anti-blooming control circuit 402*i* causes the transfer pulse output circuit 44*i* to output an anti-blooming shutter to the i-th line ROW_i of the pixel array 100 at the start of the integration time of the (i−1)th line ROW_i−1 or the (i+1)th line ROW_i+1 of the pixel array; that is, for example, concurrently and/or simultaneously with application of a shutter to the (i−1)th line ROW_i−1 and/or the (i+1)th line ROW_i+1 of the pixel array 100.

Example operation of the transfer pulse generating circuit 40*i* will be described in more detail below with regard to FIGS. 4, 5, and 8.

Figure 8:
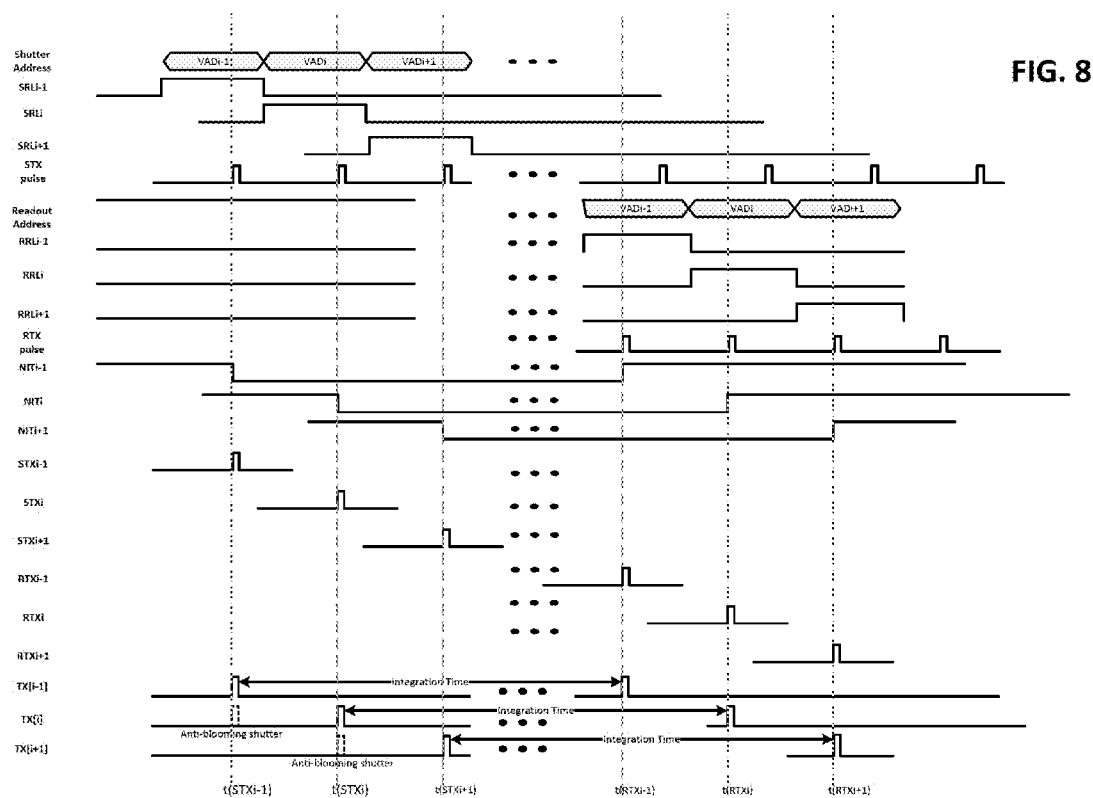
FIG. 8 shows a timing diagram for explaining example operation of the logic circuit and anti-blooming shutter control circuits shown in FIGS. 4 and 5, respectively.

FIG. 8 is a timing diagram for explaining example operation of the example embodiments shown in FIGS. 4 and 5.

The timing diagram shown in FIG. 8 illustrates example timing for shutter and readout address signals, shutter row select signals SRLi−1, SRLi, SRLi+1, readout row select signals RRLi−1, RRLi, RRLi+1, readout transfer pulses RTXP, shutter transfer pulses STXP, pixel integration status signals NITi−1, NITi, NITi+1, internal shutter transfer pulses STXi−1, STXi, STXi+1, internal readout transfer pulses RTXi−1, RTXi, RTXi+1, transfer pulses TX[i−1], TX[i], TX[i+1], and anti-blooming shutters at times t(STXi−1), t(STXi), t(STXi+1), t(RTXi−1), t(RTXi), and t(RTXi+1). However, for the sake of brevity and because signals applied at various times are similar, only time t(STXi−1) and t(STXi) will be discussed in detail. Time t(RTXi) is also mentioned briefly.

Referring to FIGS. 4, 5 and 8, when the (i−1)th line ROW_i−1 of the pixel array 100 is to be integrated, the decoder circuit 1026 receives shutter address VADi−1 and enables the shutter row select signal SRLi−1 in response to the received shutter address VADi−1.

At time t(STXi−1), in response to shutter transfer pulse STXP, the shutter and readout transfer pulse generating circuit 4000*i*−1 outputs the internal shutter transfer pulse STXi−1 and a shutter transfer pulse TX[i−1] to initiate integration of the (i−1)th line ROW_i−1 of the pixel array 100.

Also at time t(STXi−1), the non-integration time signal NITi for the i-th line ROW_i is in an enabled state indicating that the i-th line ROW_i is not currently being integrated. Moreover, the enable signal EN is enabled. Accordingly, in response to the internal shutter pulse signal STXi−1, the OR gate 4024 of the anti-blooming shutter control circuit 402*i* outputs an adjacent shutter status pulse STATi to the AND gate 4022. The adjacent shutter status pulse STATi is indicative of an integration status of one or more of lines ROW_i−1 and ROW_i+1 of the pixel array 100.

In response to the adjacent shutter status pulse STATi, the AND gate 4022 outputs the anti-blooming shutter control pulse CTRLi. In response to the anti-blooming shutter control pulse CTRLi, the transfer pulse output circuit 44*i* outputs the anti-blooming shutter to the i-th line ROW_i of the pixel array 100 simultaneously or concurrently with the application of the shutter transfer pulse to the (i−1)th line ROW_i−1 of the pixel array 100.

Still referring to FIGS. 4, 5 and 8, when the i-th row of the pixel array 100 is to be integrated, the decoder circuit 1026 receives shutter address VADi and enables the shutter row select signal SRLi in response to the received shutter address VADi.

At time t(STXi), the shutter and readout transfer pulse generating circuit 4000*i* outputs the internal shutter transfer pulse STXi in response to the shutter transfer pulse STXP. The internal shutter transfer pulse STXi causes application of a shutter transfer pulse TX[i] to the i-th line ROW_i of the pixel array, which initiates integration of the i-th line ROW_i of the pixel array 100.

In response to the internal shutter transfer pulse STXi, the latch circuit FFi disables the non-integration time signal NITi indicating that the i-th line ROW_i is in integration time (currently being integrated and/or exposed). The disabling of the non-integration time signal NITi disables the anti-blooming shutter control signal CTRLi so that an anti-blooming shutter is not applied while the i-th line ROW_i is being integrated.

As shown in FIG. 8, the latch circuit FFi continues to output the disabled non-integration time signal NITi until the i-th line ROW_i is readout at time t(RTXi) in response to an enabled readout row select signal RRLi and the readout transfer pulse RTXP.

Still referring to time t(STXi) in FIG. 8, the non-integration time signal NITi+1 is in an enabled state indicating that the (i+1)th line ROW_i+1 is not currently being integrated. Moreover, the enable signal EN is enabled. Accordingly, an anti-blooming shutter is applied to the (i+1)th line ROW_i+1 of the pixel array at time t(STXi) in response to the internal shutter transfer pulse STXi for the i-th line ROW_i.

Figure 6:
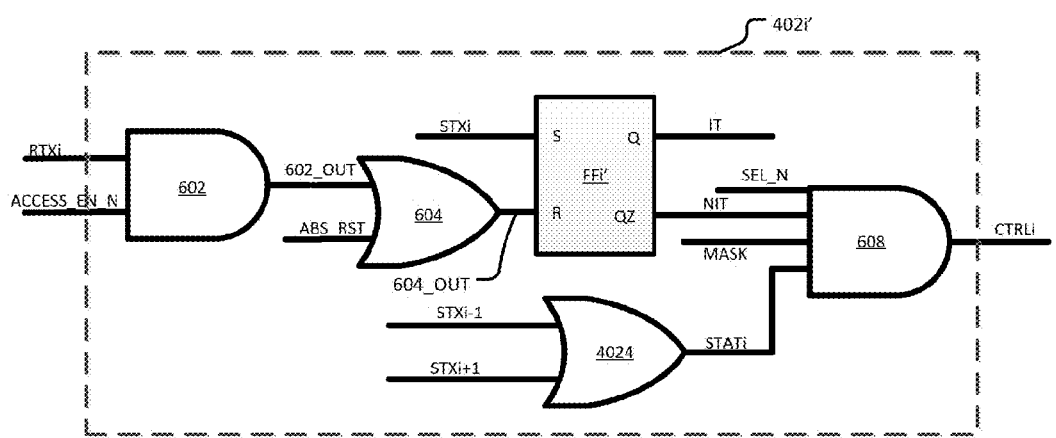
FIG. 6 illustrates an anti-blooming shutter control circuit according to another example embodiment.

FIG. 6 illustrates another example embodiment of an anti-blooming shutter control circuit 402*i*′.

According to at least this example embodiment, the anti-blooming shutter control circuit 402*i*′ (and corresponding transfer pulse generating circuit) are configured to determine an access status of the i-th line ROW_i of the pixel array 100, and to selectively apply the anti-blooming shutter to the i-th line ROW_i based on the determined access status of the i-th line ROW_i. The access status may be indicative of: whether the i-th line ROW_i has been at least one of integrated and readout; whether at least one of a shutter transfer pulse or a readout pulse has been applied to the i-th line ROW_i; and/or whether at least one of integration and readout of the i-th line ROW_i is disabled.

The anti-blooming shutter control circuit 402*i*′ may be configured to apply the anti-blooming shutter to the i-th line ROW_i if the at least one of the integration and readout of the i-th line ROW_i is disabled.

Referring in more detail to FIG. 6, an AND gate 602 generates an output pulse 602_OUT based on the internal readout transfer pulse RTXi and an access (e.g., readout and/or integration) disable signal ACCESS_EN_N. The output signal 602_OUT is output to an OR gate 604. The access disable signal ACCESS_EN_N enables application of the anti-blooming shutter only to lines of the pixel array that are never accessed (e.g., integrated and/or readout) by the image sensor. That is, in this example, the anti-blooming shutter may be applied to lines of the pixel array in which integration and/or readout is disabled.

Still referring to FIG. 6, the OR gate 604 generates an output signal 604_OUT based on the output signal 602_OUT from the AND gate 602 and anti-blooming shutter reset signal ABS_RST, and outputs the output signal 604_OUT to the latch circuit FFi′. The anti-blooming shutter reset signal ABS_RST enables the latch circuit FFi′ to be initialized to a known state. In this case, the outputs Q and QZ may be initialized to an enabled or disabled state. The latch circuit FFi′ operates in the same manner as the latch circuit FFi discussed above with regard to FIG. 5. Therefore, further discussion of the latch circuit FFi′ is omitted.

Still referring to FIG. 6, the anti-blooming shutter control circuit 402*i*′ includes the OR gate 4024, which generates an adjacent shutter status pulse STATi by performing an OR operation between the internal shutter transfer pulse STXi−1 and the internal shutter transfer pulse STXi+1. The OR gate 4024 outputs the adjacent shutter status pulse STATi to an AND gate 608.

The AND gate 608 is similar to the AND gate 4022 discussed above, except that the AND gate 608 receives an anti-blooming shutter blocking signal SEL_N and a mask signal MASK rather than the enable signal EN. The anti-blooming shutter blocking signal SEL_N enables blocking of the anti-blooming shutter when a line is being readout by the image sensor, such that the anti-blooming shutter is not applied during readout. The mask signal MASK enables the anti-blooming shutter to be selectively enabled and disabled for a given line of the pixel array.

The AND gate 608 generates the anti-blooming shutter control pulse CTRLi based on the anti-blooming shutter blocking signal, the mask signal MASK, the pixel array integration status signal NITi and the adjacent shutter status pulse STATi. The AND gate 608 outputs the anti-blooming shutter control pulse CTRLi to the transfer pulse output circuit 44*i* shown in FIG. 4. The remaining portions of the anti-blooming shutter control circuit 402*i*' shown in FIG. 6 operate in the same or substantially the same manner as that discussed above with regard to FIG. 5.

FIGS. 7A through 7D show example pulse sequence diagrams for illustrating example timing of readout pulses, shutter pulses and anti-blooming shutter pulses applied to lines of a pixel array.

Referring to FIG. 7A, in this example, when a shutter pulse is applied to Row 1, an anti-blooming shutter pulse is applied to each of adjacent lines Row 0 and Row 2. In this case, Row 2 is the line to be exposed subsequent (e.g., immediately after) Row 1.

When a shutter pulse is applied to Row 2, an anti-blooming shutter pulse is concurrently or simultaneously applied to adjacent Row 3, which is also the line to be exposed subsequent (e.g., immediately after) Row 2. When a shutter pulse is applied to Row 3, an anti-blooming shutter pulse is applied to adjacent Row 4, which is the next and last row to be exposed in the example shown in FIG. 7A. When a shutter pulse is applied to Row 4, an anti-blooming shutter pulse is concurrently or simultaneously applied to adjacent Row 5.

The exposed rows Row 1, Row 2, Row 3 and Row 4 are readout in sequence at the end of their respective integration times in response to respective readout pulses.

FIG. 7B illustrates example timing of readout pulses, shutter pulses and anti-blooming shutter pulses applied to lines of a pixel array when utilizing relatively short exposure times.

Referring to FIG. 7B, as in the example shown in FIG. 7A, when a shutter pulse is applied to Row 1, an anti-blooming shutter pulse is applied to each of adjacent rows Row 0 and Row 2. In this case, Row 2 is the next row to be exposed.

When a shutter pulse is applied to Row 2, an anti-blooming shutter pulse is concurrently or simultaneously applied to adjacent Row 3, which is the next row to be exposed after Row 2. When a shutter pulse is applied to Row 3, an anti-blooming shutter pulse is applied to adjacent Row 4, which is the next and last row to be exposed after Row 3 in the example shown in FIG. 7B. When a shutter pulse is applied to Row 4, an anti-blooming shutter pulse is concurrently or simultaneously applied to adjacent Row 5.

The exposed rows Row 1, Row 2, Row 3 and Row 4 in FIG. 7B are readout in sequence at the end of their respective integration times in response to respective readout pulses.

In the example shown in FIG. 7C, Row 1 and Row 3 are exposed concurrently or simultaneously and then readout concurrently or simultaneously. Subsequently, Row 2 and Row 4 are exposed concurrently or simultaneously and then readout concurrently or simultaneously.

In this example, when shutter pulses are applied to Row 1 and Row 3, anti-blooming shutter pulses are applied to each of adjacent lines Row 0, Row 2 and Row 4.

When shutter pulses are applied to Row 2 and Row 4, an anti-blooming shutter pulse is applied to adjacent Row 5.

At the end of their integration time, each of Row 1 and Row 3 are readout in response to respective readout pulses. Similarly, at the end of the integration time for Row 2 and Row 4, these rows are readout in response to respective readout pulses.

In the example shown in FIG. 7D, the rows are exposed and readout in reverse order relative to the sequence shown in FIG. 7A. This is sometimes referred to as a vertical mirror.

Referring to FIG. 7D, when a shutter pulse is applied to Row 4, an anti-blooming shutter pulse is applied to each of adjacent lines Row 5 and Row 3. In this case, Row 3 is the next line to be exposed after Row 4.

When a shutter pulse is applied to Row 3, an anti-blooming shutter pulse is concurrently or simultaneously applied to adjacent Row 2, which is the next row to be exposed after Row 3. When a shutter pulse is applied to Row 2, an anti-blooming shutter pulse is applied to adjacent Row 1, which is the next and last row to be exposed after Row 2 in the example shown in FIG. 7D. When a shutter pulse is applied to Row 1, an anti-blooming shutter pulse is concurrently or simultaneously applied to adjacent Row 0.

The exposed rows Row 4, Row 3, Row 2 and Row 1 are readout in sequence at the end of their respective integration times in response to respective readout pulses.

Figure 9:
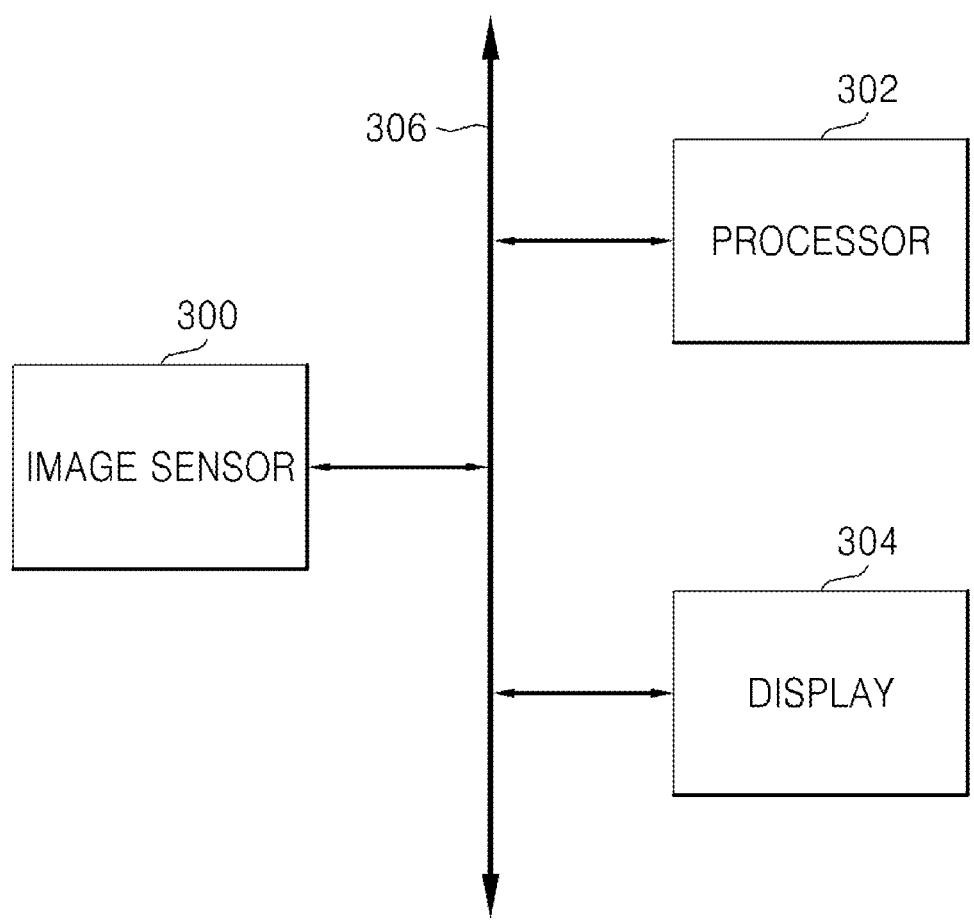
FIG. 9 illustrates a digital imaging system according to an example embodiment.

FIG. 9 is a block diagram illustrating a digital imaging system according to an example embodiment.

Referring to FIG. 9, a processor 302, an image sensor 300, and a display 304 communicate with each other via a bus 306. The processor 302 is configured to execute a program and control the digital imaging system. The image sensor 300 is configured to capture image data by converting optical images into electrical signals. The image sensor 300 may be an image sensor as described above with regard to FIG. 1. The processor 302 may include the image signal processor 108 shown in FIG. 1, and may be configured to process the captured image data for storage in a memory (not shown) and/or display by the display unit 304. The digital imaging system may be connected to an external device (e.g., a personal computer or a network) through an input/output device (not shown) and may exchange data with the external device.

For example, the digital imaging system shown in FIG. 9 may embody various electronic control systems including an image sensor (e.g., a digital camera), and may be used in, for example, mobile phones, personal digital assistants (PDAs), laptop computers, netbooks, tablet computers, MP3 players, navigation devices, household appliances, or any other device utilizing an image sensor or similar device.

The foregoing description of example embodiments has been provided for purposes of illustration and description. It is not intended to be exhaustive or limiting. Individual elements or features of a particular embodiment are generally not limited to that particular embodiment. Rather, where applicable, individual elements or features are interchangeable and may be used in a selected embodiment, even if not specifically shown or described. The same may also be varied in many ways. All such modifications are intended to be included within the scope of this disclosure.

What is claimed is:

1. A line driver of an image sensor, the line driver comprising:
    at least a first transfer pulse generating circuit configured to determine an integration status of a first group of pixels, and to selectively apply an anti-blooming shutter to the first group of pixels based on the determined integration status of the first group of pixels, wherein
    the first transfer pulse generating circuit is configured to apply the anti-blooming shutter to the first group of pixels in response to a shutter transfer pulse associated with a second group of pixels when the first group of pixels is in non-integration time.

2. The line driver of claim 1, wherein the first transfer pulse generating circuit corresponds to the first group of pixels, and wherein the line driver further includes,
    a second transfer pulse generating circuit corresponding to the second group of pixels, the second transfer pulse generating circuit being configured to output the shutter transfer pulse to the first transfer pulse generating circuit.

3. The line driver of claim 1, wherein the first transfer pulse generating circuit comprises:

a first anti-blooming shutter control circuit configured to determine the integration status of the first group of pixels based on a transfer pulse corresponding to the first group of pixels, the transfer pulse being one of a readout transfer pulse and a shutter transfer pulse corresponding to the first group of pixels.

4. The line driver of claim 3, wherein the first anti-blooming shutter control circuit is configured to store the integration status of the first group of pixels.

5. The line driver of claim 4, wherein the first anti-blooming shutter control circuit comprises:
   a storage circuit configured to store the integration status of the first group of pixels; and
   a logic circuit configured to generate an anti-blooming shutter control pulse based on the stored integration status and an integration status of a second group of pixels.

6. The line driver of claim 3, wherein the first anti-blooming shutter control circuit is configured to prevent application of the anti-blooming shutter to the first group of pixels during integration of the first group of pixels.

7. The line driver of claim 3, wherein the first anti-blooming shutter control circuit is further configured to generate a first anti-blooming shutter control pulse based on the transfer pulse corresponding to the first group of pixels and the shutter transfer pulse associated with the second group of pixels, and wherein the first transfer pulse generating circuit further includes,
   a transfer pulse output circuit configured to selectively output the anti-blooming shutter to the first group of pixels based on the first anti-blooming shutter control pulse.

8. The line driver of claim 1, wherein the first transfer pulse generating circuit is configured to apply the anti-blooming shutter only during non-integration time.

9. An image sensor comprising:
   a pixel array including the first group of pixels; and
   the line driver of claim 1 configured to select groups of pixels for output by the active pixel array.

* * * * *